United States Patent [19]
Gruett

[11] Patent Number: 4,784,584
[45] Date of Patent: Nov. 15, 1988

[54] METERING DEVICE
[75] Inventor: Donald G. Gruett, Manitowoc, Wis.
[73] Assignee: Oil-Rite Corporation, Manitowoc, Wis.
[21] Appl. No.: 75,040
[22] Filed: Jul. 17, 1987
[51] Int. Cl.[4] ............................................. F04B 39/10
[52] U.S. Cl. ..................... 417/399; 417/443; 417/511; 417/570
[58] Field of Search ............... 417/399, 401, 511, 469, 417/570, 443

[56] References Cited
U.S. PATENT DOCUMENTS

| | | | |
|---|---|---|---|
| 2,457,339 | 12/1948 | Bertea | 417/570 X |
| 2,605,021 | 7/1952 | Churchill et al. | 417/511 |
| 2,818,029 | 12/1957 | Petzold | 417/511 |
| 2,931,313 | 4/1960 | Hughes | 417/511 |
| 3,306,231 | 2/1967 | Cadiou | 417/511 |
| 3,930,756 | 1/1976 | Bruggeman | 417/511 |
| 4,436,494 | 3/1984 | Yamaizumi | 417/511 |

Primary Examiner—Leonard E. Smith
Attorney, Agent, or Firm—Andrus, Sceales, Starke & Sawall

[57] ABSTRACT

The metering device for a liquid medium comprises a cylinder and a piston operatively disposed therein to define a metering chamber ahead of the piston. The outlet end of the cylinder is open and closed by check valve means. The piston is driven forwardly through a working stroke to force the liquid medium in the metering chamber out of the chamber and past the check valve means. The piston breaks the plane of the open end of the cylinder on each working stroke to preclude entrapment of air in the metering chamber and thus provide for more accurate metering.

4 Claims, 3 Drawing Sheets

METERING DEVICE

BACKGROUND OF THE INVENTION

This invention relates to a metering device for the precision feeding of a liquid medium, even in relatively small or minute quantities.

Oil lubricants are among the many liquids which are at times metered. In a given instance, the feeding of too little oil may place a machine at risk. Too much oil may contaminate a product and contribute to pollution. Thus, accuracy in metering can be very important.

While accuracy in metering is generally desired, it is often difficult to attain. Air often gets into a feeding or metering system and becomes entrapped in the metering chamber. The entrapped air in the metering chamber will displace liquid medium in the measured quantity to render metering in minute quantities virtually impossible and in larger quantities inaccurate. It is generally an object of this invention to provide a metering device for a liquid medium wherein entrapment of air in the metering chamber is generally precluded to provide for more accurate metering even in minute quantities.

SUMMARY OF THE INVENTION

The invention resides in a metering device for a liquid medium and which comprises a housing having an inlet and an outlet for the liquid medium. A cylinder is disposed in the housing and has an open end that communicates with the housing outlet. Check valve means are provided in the housing and biased to close the open end of the cylinder. A piston is operatively disposed in the cylinder and forms therewith a metering chamber ahead of the piston. Means are provided to conduct the liquid medium from the inlet to the metering chamber. Means are further provided to drive the piston forwardly through a working stroke to force the liquid medium in the metering chamber out of the chamber and past the check valve means toward the housing outlet. The piston breaks the plane of the open end of the cylinder on each working stroke to generally preclude entrapment of air in the metering chamber and thus provide for more accurate metering of the liquid medium, even in minute quantities.

BRIEF DESCRIPTION OF THE DRAWING FIGURES

The drawings furnished herewith illustrate the best mode presently contemplated for the invention and are described hereinafter.

DESCRIPTION OF THE ILLUSTRATED EMBODIMENTS

Figure 1:
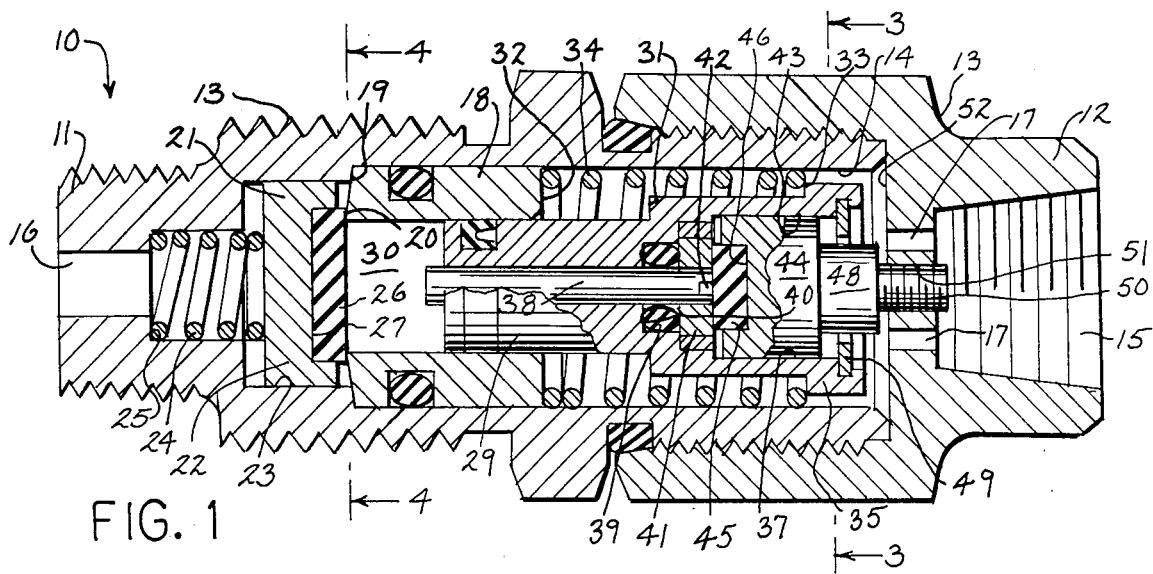
FIG. 1 is a sectional view through an hydraulic metering device according to this invention.

Referring initially to FIGS. 1-4 of the drawings, the hydraulic metering device 10 of this invention is intended to be disposed in a liquid medium supply line. A pump, not shown, delivers the liquid medium to the metering device 10 in pressure pulses for metered flow to a user assembly, not shown.

The metering device 10 generally comprises a pair of opposed hollow fittings 11 and 12 which are threadedly engaged to form the housing 13 having a stepped cylindrical chamber 14. The female fitting 12 is provided with an inlet 15 and the male fitting 11 with an outlet 16. As shown in the drawings, the inlet 15 and outlet 16 may be axially aligned with the chamber 14 and to each other. One or more openings 17 place the fitting inlet 15 in communication with the chamber 14.

A cylindrical sleeve 18 is disposed in the chamber 14 generally adjacent to the outlet 16 and in abutting relation with the annular shoulder 19. The end of the sleeve 18 adjacent to the outlet 16 is tapered as viewed in section to provide a peripheral edge 20 that projects forwardly in the direction of the outlets at the inside diameter of the sleeve.

Figure 4:
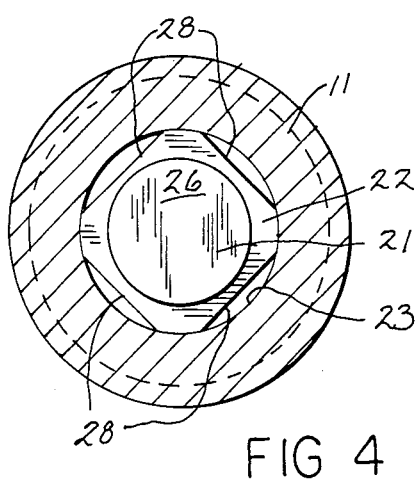
FIG. 4 is a sectional view taken generally along the line 4—4 in FIG. 1.

At the peripheral sleeve edge 20, a check valve member 21 provides closure for the end of sleeve 18. Valve member 21 comprises a carrier 22 which is axially slidable in the reduced diameter portion 23 of chamber 14 and is biased to the sleeve closure position shown in FIG. 1 by the coil spring 24 extending between the shoulder 25 adjacent to the outlet 16 and the carrier 22. Facing the sleeve 18 and generally centrally thereof the carrier 22 is provided with a cylindrical resilient sealing block 26. The sealing block 26 is seated in the carrier recess 27 and is engaged upon the sleeve edge 20 to effect closure of the sleeve end. The periphery of the carrier 22 is provided with one or more flats 28 as shown in FIG. 4, so that the interior of the cylinder sleeve 18 is placed in communication with the outlet 16 when the check valve member 21 is open.

Figure 2:
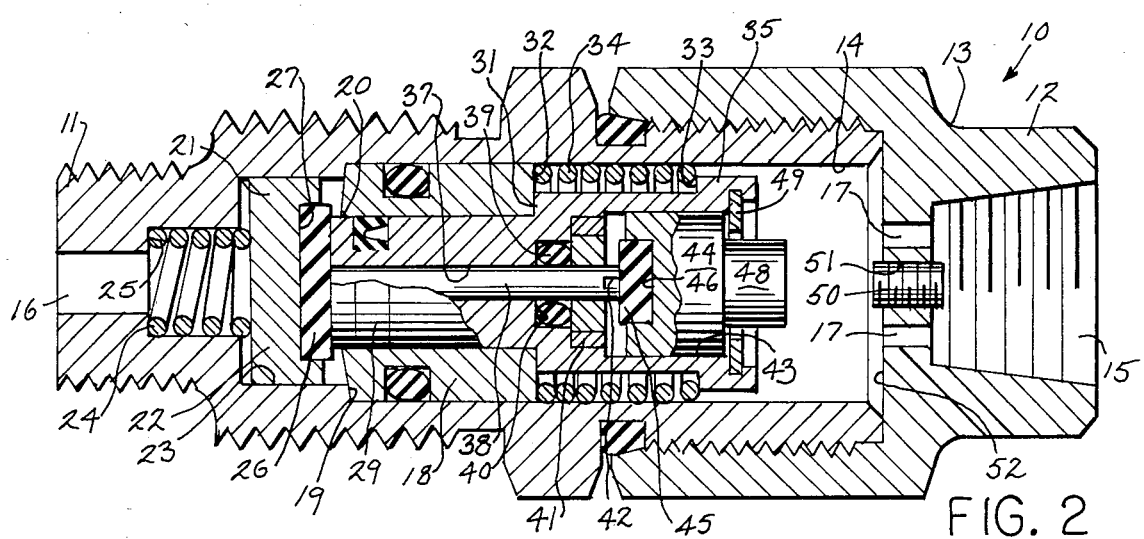
FIG. 2 is a sectional view similar to that of FIG. 1 and shows the metering device generally at the end of a pressure or working stroke.

A piston 29 is operatively disposed within the cylinder sleeve 18 and forms therewith the piston or metering chamber 30 as shown in FIG. 1 to be ahead of the piston. Externally the piston 29 is stepped providing intermediate its length the annular shoulder 31 which during the working stroke of the piston is engageable with the rear end 32 of sleeve 18 to terminate the working stroke. When the stop shoulder 31 engages with the end 32 of sleeve 18, the forward end of the piston 29 will have broken the plane of sleeve edge 20, as shown in FIG. 2, to completely void or purge the chamber 30.

Figure 3:
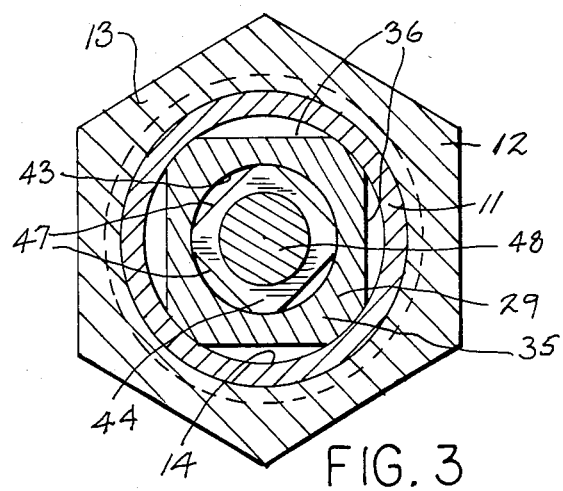
FIG. 3 is a sectional view taken generally along the line 3—3 in FIG. 1.

Adjacent to the rear end of the stepped piston 29, an annular shoulder 33 provides an abutment for the piston return coil spring 34 disposed between the shoulder 33 and the rear end 32 of sleeve 18. The end portion 35 of piston 29 rearwardly from the shoulder 33 is slidable along the cylindrical wall of chamber 14. As shown in FIG. 3, the piston end portion 35 is provided with one or more flats 36 so that pressure will be equalized on opposite sides of that piston portion.

The piston 29 is provided with an axially extending stepped bore 37 internally thereof to accommodate an axially slidable hollow tube or spool valve 38 therein adjacent to the forward end thereof. The spool valve 38 extends through an annular resilient friction lock and seal member 39 disposed intermediate the length of the piston 29 between the rearwardly facing annular shoulder 40 and the opposed annular securement member 41 threadedly engaged in the piston bore 37. The spool valve 38 extends through the securement member 41 and the rearward end thereof is provided with a recess opening 42.

Rearwardly from the securement member 41, the stepped piston bore 37 includes an enlarged bore portion 43 which opens toward the rear of the piston 29 and receives an axially slidable valve member 44. The forward face of the valve member 44 carries a projecting cylindrical resilient sealing block 45 mounted in the valve member recess 46. The sealing block 45 is in alignment with and engageable by the rear end of the spool valve 38. The sliding surface of valve member 44 is provided with one or more flats 47 to provide for the passage of liquid medium around the valve member as hereinafter further described. Rearwardly the valve member 44 is provided with a stem or projection 48 of reduced diameter. Adjacent to the rear end of the piston bore 37, a snap ring 49 is seated in the bore to keep the valve member 44 contained within the bore.

An adjusting set screw 50 is disposed in the threaded inlet hole 51 generally centrally of the inlet 15. When the screw 50 is fully retracted from the chamber 14, the projecting stem 48 of valve member 44 will have the capability of being biased against the rear housing wall 52 to provide for a piston chamber 30 of maximum length for maximum feeding of liquid medium with each working stroke of the piston 29. As the set screw 50 is turned to project inwardly from the wall 52, the piston chamber 30 will be correspondingly shortened and provide for corresponding feeding of liquid medium with each piston stroke. The amount of feeding by the metering device 10 is not only controlled by the size of the piston chamber 30, but also by the pulsing rate of the pump, not shown.

In the operation of the metering device 10 of FIGS. 1-4, a pressure pulse from an hydraulic pump, not shown, initiates a power or working stroke of the piston 29. Initially during the working stroke, the piston 29 along with the spool valve 38 in its closed, forwardly projecting position and the valve member 44 all move together as a unit. When the pressure in the piston chamber, 30 exceeds the biasing force of the spring 24, the check valve 21 opens to allow the liquid medium content in the piston chamber to escape toward and through the outlet 16.

Toward the end of the working stroke of the piston 29, the leading end of the spool valve 38 initially engages with the check valve 21. After the forward progress of the spool valve 38 has been arrested, the piston 29 completes its working stroke by moving relative to the spool valve and valve member 44. At the end of the working stroke of the piston 29, the forward end of the piston and forward edge of the spool valve 38 will generally be in a common plane, as generally shown in FIG. 2, such that the opposed aft end of the spool valve will now project rearward beyond the securement member 41 to expose or open the spool valve recess 42 to the liquid medium in the chamber 14 behind the piston 29. Even while the spool valve recess 42 is being opened at the end of the working stroke of piston 29, passage of the liquid medium through the metering device 10 is blocked at this time by engagement of the check valve 21 on the opposite or forward end of the spool valve 38.

At the termination of the pressure pulse, the check valve 21 is biased to closure again by the spring 24 as the piston 29 together with the spool valve 38 and valve member 44 commence their return stroke in response to the biasing force of the spring 34. Initially as the piston 29 moves rearwardly on the return stroke, the spool valve 38 will remain aftward relative to the piston, being held in that position by the friction seal member 39. As a consequence the spool valve 38 is now able to serve as a conduit to conduct displaced liquid, medium from chamber 14 behind the piston 29 to fill the piston chamber 30 during the return stroke. At the conclusion of the return stroke of piston 29, travel of the valve member 44 and the spool valve 38 are interrupted by engagement of the valve member 44 with the end wall 52 or adjusting screw 50. The piston 29 meanwhile continues aftward relative to the spool valve 38 to effect a reengagement between the securement member 41 and valve member 44 and thereby simultaneously effect a reclosure of the spool valve. The metering device 10 is then ready for the next cycle of operation.

If a source of air pressure is already available, a potential customer may prefer the pneumatically operated metering device 54 of FIGS. 5-9.

In the embodiment of FIGS. 5-9, the housing 55 comprises a male and female fitting 56 and 57 which are threadedly engaged to form a stepped cylindrical chamber 58. The chamber 58 includes an outlet 59 disposed at the end of the male fitting 56.

A cylindrical sleeve 60 is disposed in the chamber 58 generally adjacent to the outlet 59 and in abutting relation with the shoulder 61. The end of the sleeve 60 adjacent to the outlet 59 is tapered as viewed in section to provide a peripheral edge 62 at the inside diameter that projects rearwardly in the direction of the outlet. A check valve 21 generally similar to that of FIG. 1 closes the outlet end of the sleeve 60.

The male fitting 56 is provided with a plurality of inlet openings 63 for the liquid medium being metered. The inlet openings 63 extend generally normal to chamber 58 and sleeve 60 and communicate with the inside of the sleeve through the passage 64 intermediate the length of the sleeve. In radial alignment with the passage 64 an annular groove 65 is provided exteriorly of the sleeve 60. When but a single metering device 54 is required or desired, the liquid medium supply is connected to one of the inlet openings 63 and the other inlet opening is plugged or otherwise closed.

A dual piston arrangement is deployed within the cylinder sleeve 60 and is actuated by bursts or pulses of air pressure from a source, not shown, acting through the axially extending air inlet 66 provided generally centrally at the end of the female fitting 57.

Figure 5:
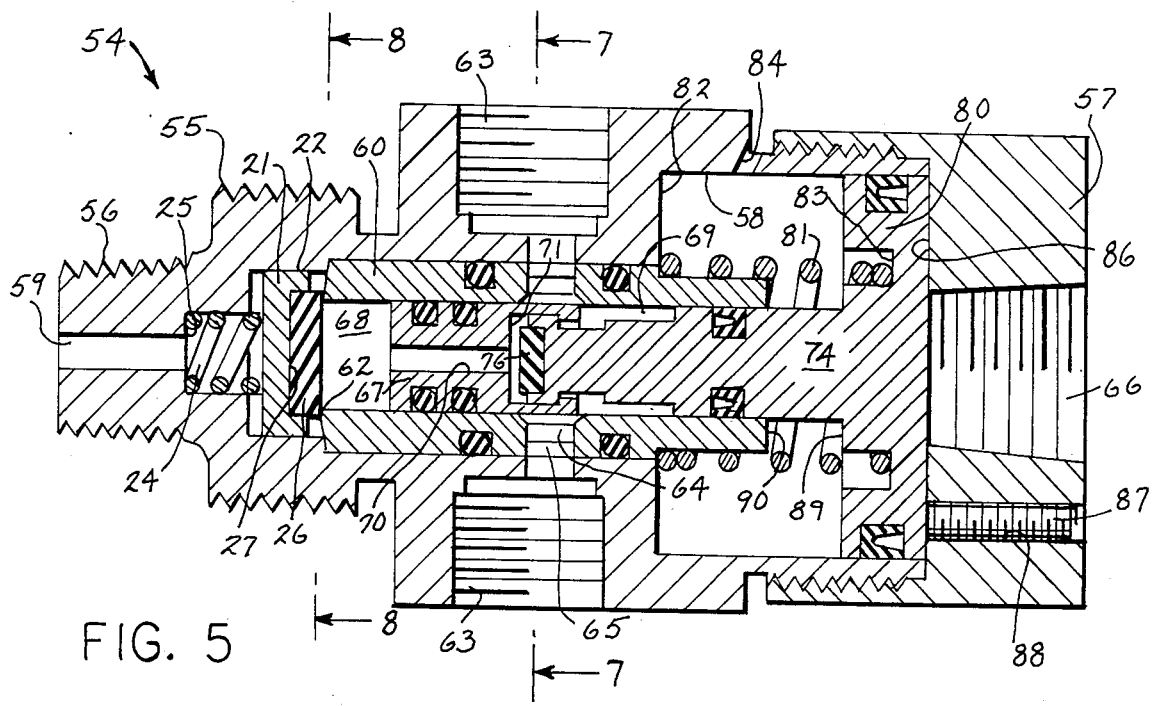
FIG. 5 is a sectional view of a pneumatically operated metering device according to this invention.

A metering piston 67 is operatively disposed within the cylinder sleeve 60 and forms therewith the piston or metering chamber 68 as shown in FIG. 5 to be ahead of the metering piston. As further shown in FIG. 5, the metering chamber 68 ahead of the piston 67 communicates with the chamber 69 behind the piston 67 by means of the generally central, axially extending through bore 70. The cylinder chamber 69 behind the metering piston 67 in turn communicates with the liquid medium inlet opening 63. Rearwardly the metering piston 67 is provided with an end surface 71 disposed generally normal to the piston axis and a pair of diametrically opposed projections 72 extend rearwardly from the surface 71. The projections 72 in section extend arcuately and have a common outside diameter with the piston 67. The projections 72 terminate with transversely aligned inwardly directed radial flanges 73.

An actuating piston 74 is operatively disposed within the cylinder sleeve 60 behind the metering piston 67 and is interconnected therewith as will be explained hereinafter. The forward or leading end of the actuating piston 74 is provided with a cylindrical portion 75 which is slidably disposed within the opposed arcuate projections 72 on the metering piston 67. The forward face of the actuating piston portion 75 carries a cylindrical sealing block 76 which is seated in the recess 77. The actuating piston sealing block 76 is selectively engageable with the rear surface 71 of the metering piston 67 to close the through bore 70. Immediately adjacent and to the rear of the piston portion 75, the actuating piston 74 is provided with an outwardly opening annular groove 78. The radial flanges 73 on the metering piston projections 72 project into the groove 78. The width of the groove 78 is intended to accommodate the movement of the actuating piston 74 relative to the metering piston 67 between the position of bore closure wherein the sealing block 76 engages with the rear surface 71 of the metering piston to close the bore 70 and a position for actuating the metering piston aftward wherein the metering piston flanges 73 are engaged by the rearwardly facing annular shoulder 79 formed by the groove 78.

Rearwardly the actuating piston 74 terminates with a diametrically enlarged portion 80 which is slidably disposed in an enlarged portion of chamber 58. A return spring 81 for the actuating piston 74 is disposed between the rearwardly facing shoulder 82 of chamber 58 and the forwardly opening annular groove 83 formed in the portion 80 of piston 74. A vent opening 84 in the wall of chamber 58 precludes pressure build up ahead of the enlarged portion 80 of the piston 74.

The enlarged end portion 80 of the piston 74 terminates with an end surface 85 generally normal to the piston axis and which is engageable with the end wall 86 of chamber 58 as shown in FIG. 5 when the piston chamber 68 is of maximum length for maximum feeding of liquid medium. The size of the piston chamber 68 may be selectively varied by the adjusting set screw 87 disposed in the threaded hole 88 that generally parallels the air inlet 66. The set screw 87 is engageable with the rear surface 85 of the piston 74 to adjust the dual piston arrangement for desired feeding of liquid medium. The size of the metering chamber 68 may also be selectively varied by imposing a corresponding constant pressure on the rear of the actuating piston 74.

Figure 6:
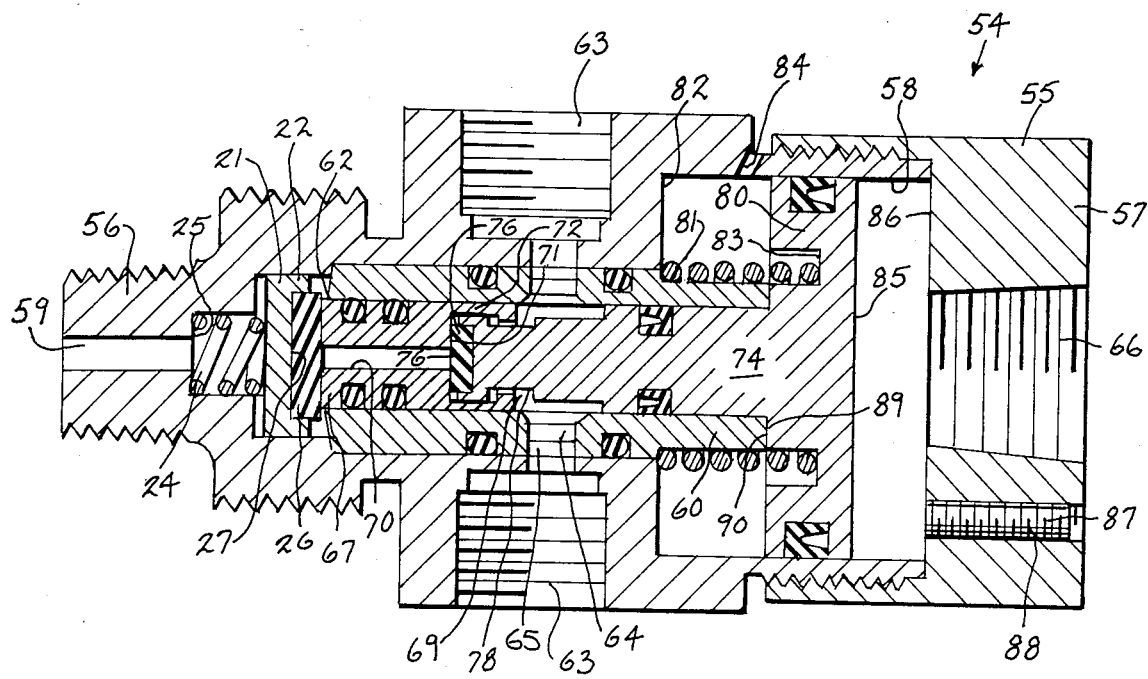
FIG. 6 is a sectional view similar to that of FIG. 5 and shows the metering device generally at the end of its pressure or working stroke.
Figure 7:
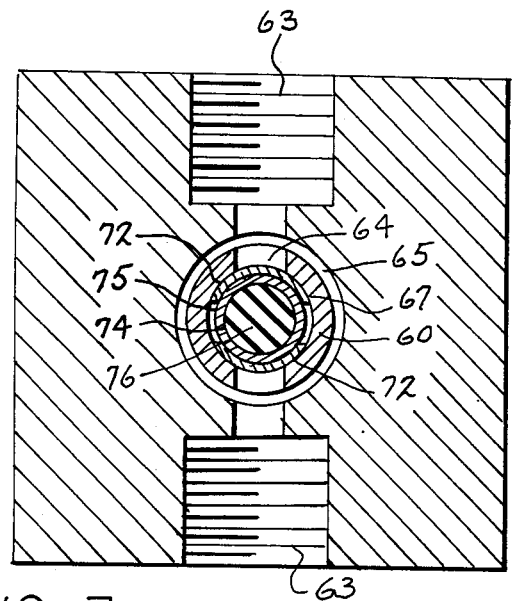
FIG. 7 is a sectional view taken generally along the line 7—7 in FIG. 5.
Figure 8:
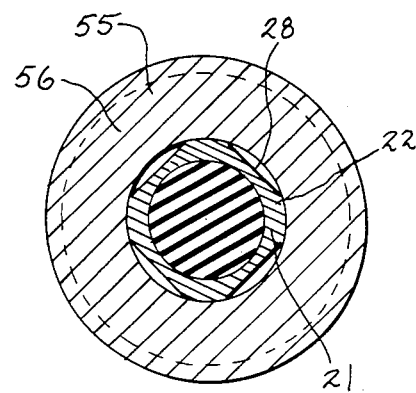
FIG. 8 is a sectional view taken generally along the line 8—8 in FIG. 5.
Figure 9:
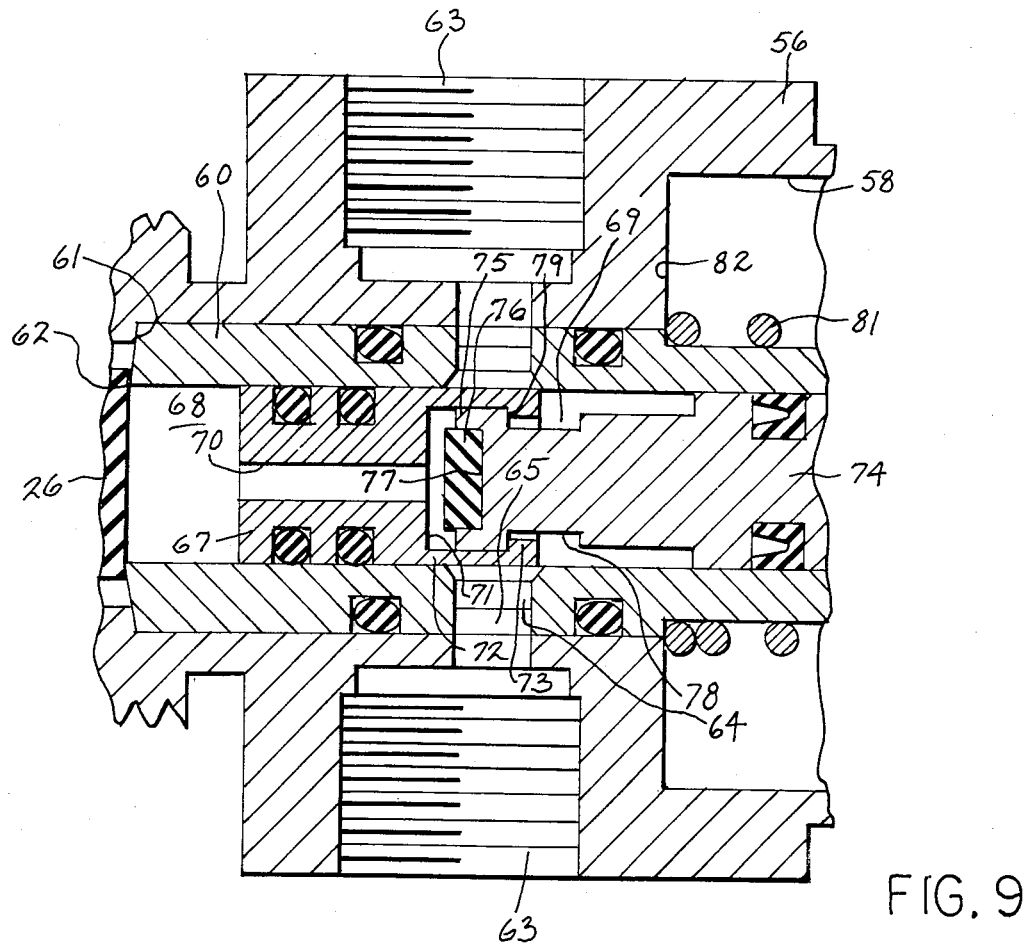
FIG. 9 is an enlarged sectional view showing the lost motion connection between the metering piston and actuating piston.

During operation of the metering device 54, the liquid medium being metered is fed through the inlet 63 under pressure and provides a solid fill in the chambers 68 and 69 and connecting piston through bore 70 when the bore is open. With the metering chamber 68 filled in the condition illustrated in FIG. 5, a burst or pulse of air pressure through the inlet 66 will drive the dual piston arrangement forwardly. Initially the actuating piston 74 will move relative to the metering piston 67 to engage the sealing block 76 on the aft surface 71 of the metering piston to close the piston bore 70. Following the engagement between the pistons 74 and 67, they continue forwardly as a unit. When the pressure in the metering chamber 68 exceeds the biasing force of the spring 24, the check valve 21 will open permitting passage of the liquid medium contents of the chamber toward the outlet 59. The power or working stroke of the two pistons 74 and 67 as a unit continues until the forwardly facing shoulder 89 on the actuating piston engages with the rearwardly facing end 90 forming a fixed stop on the cylinder sleeve 60. When the actuating piston 74 engages with the fixed stop 90, the metering piston 67 will have broken the plane defined by the outlet edge 62 of the cylinder sleeve 60 as generally shown in FIG. 6. After the liquid medium contents are forced from the chamber 68, the check valve 21 will be biased against the forward face of the metering piston 67 to close the bore 70 and the spring 81 will start the return stroke of the actuating piston 74. Initially on the return stroke, the actuating piston 74 will move relative to the metering piston 67 until the actuating piston shoulder 79 engages with the metering piston flanges 73 to pick up and return the metering piston and simultaneously open the rear end of the metering piston bore 70. Thereafter, the metering piston 67 and actuating piston 74 return as a unit while the metering chamber 68 is refilled in contemplation of the next working stroke of the dual piston arrangement.

According to the several embodiments hereinbefore described, the invention provides for a more accurate metering device. Should any air get into a liquid medium supply system which includes the metering device of this invention, such air should create no problem. Since each working stroke of the piston breaks the plane of the open end of the cylinder, the metering chamber is completely voided or purged with each stroke leaving no air for entrapment to disturb the accuracy of the metering device. With the metering device of this invention, even minute quantities of liquid medium can be accurately metered. Various modes of carrying out the invention are contemplated as being within the scope of the following claims particularly pointing out and distinctly claiming the subject matter regarded as the invention.

I claim:

1. In a metering device for a liquid medium, a housing having an inlet and an outlet for the liquid medium, a cylinder in said housing and having an open end communicating with the housing outlet, check valve means in said housing and biased to close the open end of the cylinder, a piston operatively disposed in the cylinder and forming therewith a metering chamber ahead of the piston, means to conduct the liquid medium from the inlet to the metering chamber, a second piston operatively disposed within the cylinder behind the first-mentioned piston and connected to the first-mentioned piston with a lost motion connection, and means to drive the second piston forwardly through a working stroke, said second piston during each working stroke engaging upon and driving the first-mentioned piston through a working stroke to force the liquid medium in the metering chamber out of the chamber and past the check valve means toward the housing outlet, said first-mentioned piston breaking the plane of the open end of the cylinder to completely evacuate the metering chamber on each working stroke to thereby generally preclude entrapment of air in the metering chamber and thus provide for more accurate metering of the liquid medium.

2. The structure as set forth in claim 1 wherein the second piston is pneumatically driven to actuate the first-mentioned piston through the working stroke.

3. The structure as set forth in claim 1 wherein spring means are provided to bias the second piston and first-mentioned piston rearwardly through a return stroke.

4. The structure as set forth in claim 1 wherein the first-mentioned piston is provided with an axially extending through bore for conducting the liquid medium to the metering chamber, and the lost motion connection between the first-mentioned piston and second piston provides for closure of the bore in the first-mentioned piston during the working stroke of the pistons and for opening of the bore during the return stroke of the pistons.

* * * * *